United States Patent

Gretz

[11] Patent Number: 5,939,671
[45] Date of Patent: Aug. 17, 1999

[54] CEILING MEDALLION ASSEMBLY

[75] Inventor: Thomas J. Gretz, Clarks Summit, Pa.

[73] Assignee: Arlington Industries, Inc., Scranton, Pa.

[21] Appl. No.: 08/927,614

[22] Filed: Sep. 11, 1997

[51] Int. Cl.$^6$ ............................................. H01J 5/00
[52] U.S. Cl. ................. 174/50; 174/58; 174/63; 220/241; 52/39; 248/343
[58] Field of Search ..................... 174/50, 58, 63, 174/66; 220/241; 248/906, 342, 343; 52/39

[56] References Cited

U.S. PATENT DOCUMENTS

| | | | |
|---|---|---|---|
| 2,675,607 | 4/1954 | Catlin | 29/525.03 |
| 2,824,167 | 2/1958 | Bauer | 174/63 |
| 3,052,369 | 9/1962 | Taibi | 220/3.6 |
| 3,258,239 | 6/1966 | Green | 248/342 |
| 3,993,212 | 11/1976 | Ryan | 220/3.6 |
| 4,057,164 | 11/1977 | Maier | 220/3.6 |
| 4,410,160 | 10/1983 | Alperin et al. | 248/674 |
| 5,522,577 | 6/1996 | Roesch | 248/343 |
| 5,606,147 | 2/1997 | Deschamps et al. | 174/48 |

Primary Examiner—Hyung-Sub Sough
Assistant Examiner—Dhiru R Patel

[57] ABSTRACT

A ceiling mounting assembly for holding electrical devices in place on a joist that includes an electrical box having a base of three planar surfaces, each planar surface at a different depth, a first fastener device for temporarily securing the electrical box in place, a ceiling medallion for covering the electrical box, a second fastener device for temporarily securing the ceiling medallion to the electrical box, and a fixation device for securely fastening the electrical box and the ceiling bezel to the joist. The electrical box for mounting on the joist includes a generally rectangular housing with two opposite sides having a stepped appearance defining three different depths of the housing with a third side at a first shallow depth and a fourth side at a third deepest depth, a first back piece spanning the opposite sides at a first depth approximately equal to the thickness of one half inch wall board, a second back piece spanning the opposite sides at a second depth greater than the first depth of the first back piece, the second depth approximately equal to twice the thickness of one half inch wallboard and a third back piece spanning the opposite sides and at a third depth greater than the second depth of the second back piece.

13 Claims, 6 Drawing Sheets

CEILING MEDALLION ASSEMBLY

BACKGROUND OF THE INVENTION

1. Field of the Invention

The present invention pertains to electrical ceiling device mounting assemblies and method and more particularly to mounting assemblies for ceiling fans, light fixtures or the like that may require stable heavy duty mounting structures.

2. Related Prior Art

Ceiling mounting structures for electrical devices have been requiring additional strength in our modern society with the advent of ceiling fans in addition to large electrical fixtures. Large electrical fixtures have always required added support to withstand the static load placed on the support structure. However, large electrical fixtures previously were the domain of large buildings such as hotels, large office buildings etc., due to the cost of the fixture. In our affluent economy large lighting fixtures have become popular to the extent that many homes have large chandeliers. Even more common are ceiling fans. Each of these fixtures has its own complications. Extremely large lighting fixtures have an increased static load, which must be accounted for in providing proper hanging devices. Ceiling fans may have a large heavy motor associated with the fan along with extensive lighting, which may increase the static load to the point where its hanging structure may become a consideration. However, in addition to the static load presented by the fan, motor and lighting, the fan rotation provides a dynamic load that requires design consideration in supplying a hanging structure.

There have been many efforts in the prior art to provide adequate structure to permit hanging electrical devices with high static and dynamic loads. The following patents are representative of the efforts in the prior art.

U.S. Pat. No. 4,892,211, titled "Ceiling Boxes for Ceiling Fan Support", issued to Robert W. Jorgensen relates to a ceiling box for mounting and supporting a ceiling fan to a ceiling. The ceiling box includes a top wall portion with a side wall portion surrounding the periphery of the top wall portion. The box is open at the end opposite the top wall portion and the side wall portion has a pair of flanges extending normal thereto into the open end of the box. These flanges have holes therein for receiving fan supporting screws. In a first embodiment, a pair of threaded mounting screw holes are formed in the top wall portion and are each axially aligned with an unthreaded hole that extends through the respective flange. In a second embodiment, the holes in the flanges are also threaded for added support.

U.S. Pat. No. 5,183,233, titled "Universal Fixture Support", issued to Joseph LaPalomento, relates to a support for hanging an electrical fixture to a ceiling or wall and a method for suspending the fixture. The support comprises a panel which is intended to be affixed to the grid work of a house and a support affixed to the panel which holds the electrical fixture. A slot is provided on the rear of the panel to hold the panel flush against a flat surface and to allow electrical wiring to connect to the electrical device.

U.S. Pat. No. 5,234,119, titled "Plastic Box For Ceiling Fan Support", issued to Robert W. Jorgensen et al., relates to a plastic ceiling box adapted to support a ceiling fan and adapted to be mounted on a structural member, such as a ceiling joist. The ceiling box comprises a body member having a lower wall and a pair of side walls defining a recess for snugly receiving the ceiling joist. Box mounting holes for receiving box mounting fasteners are located at opposite sides and ends of the lower wall for attaching the ceiling box to the joist. Openings for receiving fan supporting fasteners are formed in the body member adjacent the box member aid in attaching the body member to the joist. This overall arrangement provides sufficient support and strength to resist dynamic loads od a ceiling fan even though the ceiling box is formed of plastic.

U.S. Pat. No. 5,522,577, titled "Ceiling Fan Support Arrangement", issued to Mark Roesch, relates to a mounting assembly for supporting a ceiling fan from a ceiling that includes a support beam located inwardly of the ceiling surface at a predetermined distance. An electrical box having a bottom wall is directly joined to and supported from the support beam. The box has side walls extending from the bottom wall through the ceiling substantially to the exposed ceiling surface and terminating in an open end. A rigid metal plate or disk member adapted for supporting and mounting a ceiling fan is positioned over the open end of the box. The disk member is of a size sufficient to have a peripheral portion extending radially beyond the side walls of the box and a plurality of mounting screws extend from the metal disk member through the interior of the box into connected engagement with the beam for supporting the disk member from the beam without reliance on the electrical box.

Although the foregoing methods and apparatus have all attempted to solve the problem of increased loads on electrical ceiling fixtures, none have provided a universal solution that can be used either in a new installation or an existing installation that may or may not have a junction box mounted in the side of a ceiling joist.

SUMMARY OF THE INVENTION

The present invention provides a ceiling mounting assembly for holding electrical devices in place on a joist. This assembly includes an electrical box having a planar base preferably with three planar surfaces with each planar surface at a different depth. A first fastener device is provided for temporarily securing the electrical box in place. A ceiling medallion is used for covering the electrical box to provide a generally finished outward appearance. A second fastener device is provided for temporarily securing the ceiling medallion to the electrical box. A permanent fixing device is provided for securely fastening the electrical box and the ceiling medallion to the joist. The electrical box for mounting on the joist includes a generally rectangular housing with two opposite sides having a stepped appearance defining three different depths of the housing. A third side defines a first shallow depth. A fourth side defines the third, deepest depth. A first back piece is used to span the opposite sides at a first depth approximately equal to the thickness of one half inch wall board. A second back piece is used to span the opposite sides at a second depth greater than the first depth of the first back piece. The second depth is approximately equal to twice the thickness of one half inch wallboard. A third back piece is used to span the opposite sides and at a third depth greater than the second depth of the second back piece.

DESCRIPTION OF THE PREFERRED EMBODIMENT

Modern electrical devices, such as fans that are ceiling mounted, require mounting systems that have additional strength and durability. Large electrical fixtures have always required added support to withstand the static load placed on the support structure. Large electrical fixtures have an increased static load, which must be accounted for in providing added strength hanging devices. Ceiling fans may have a large heavy motor associated with the fan along with extensive lighting, which provides a large static load. However, in addition to the static load presented by the fan, motor and lighting, the fan rotation provides a dynamic load that requires design consideration in supplying a hanging structure.

The present invention provides a ceiling mounting assembly for holding electrical devices with increased strength requirements in place on a joist. This assembly includes an electrical box having a base of three planar surfaces with each planar surface at a different depth. The middle planar surface has provision for mounting on the joist. A first fastener device is provided for use with the middle planar surface to temporarily secure the electrical box in place. A ceiling medallion is used for covering the electrical box to provide a generally finished outward appearance. The ceiling medallion is temporarily held to the electrical box by a second fastener device. A permanent fixing device is provided for securely fastening the electrical box and the ceiling bezel to the joist.

Figure 1:
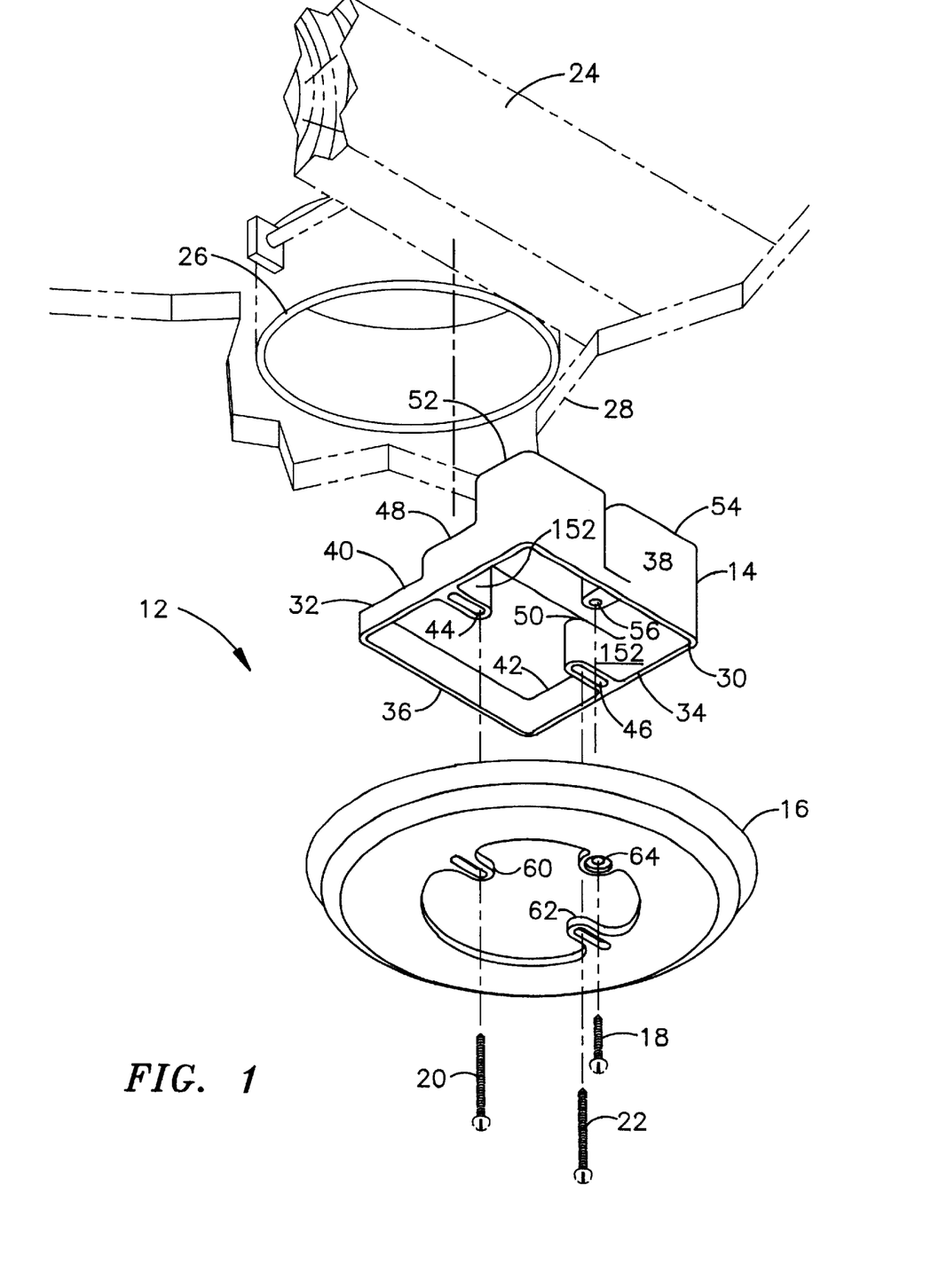
FIG. 1 is an exploded perspective view of a ceiling mounting assembly according to the present invention.

Referring now to FIG. 1, an exploded perspective view of a ceiling mounting assembly 12 according to the present invention is illustrated as including an electrical junction box 14, a cover medallion 16 with temporary holding screw 18 and mounting screws 20 and 22. Also illustrated, but in phantom, in FIG. 1 is ceiling joist 24 having electrical junction box 26 attached thereto. Plasterboard or wallboard 28 is illustrated as fixed to ceiling joist 24.

Junction box 14 is made up of housing 30 having preferably multiple depths, defined preferably by stepped sides 32 and 34 which are located opposite each other. A shallow side 36 and a deep side 38 provide the two other sides. Shallow side 36 connects steps 40 and 42 of stepped sides 32 and 34, respectively. Two slots 44 and 46 are illustrated as being formed in intermediate steps 48 and 50 of stepped sides 32 and 34, respectively. Deep side 38 connects steps 52 and 54 of stepped sides 32 and 34, respectively. Formed into side 38 is a screw hole 56 for receiving temporary holding screw 18.

Medallion 16 is illustrated as having slots 60 and 62 for receiving permanent mounting screws 20 and 22, respectively. Also illustrated is screw hole 64 for receiving temporary holding screw 18.

Figure 2:
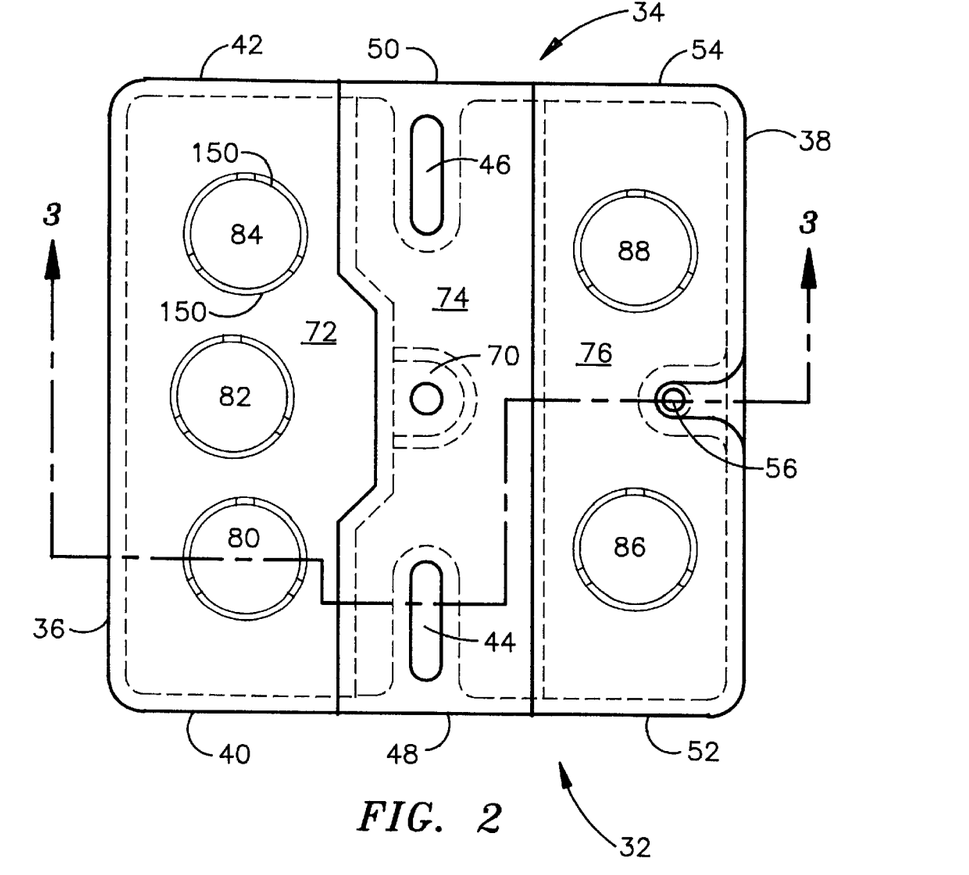
FIG. 2 is a plan view of the bottom of the junction box of the ceiling mounting assembly of FIG. 1.

In FIG. 2 a plan view of the bottom of junction box 14 of the ceiling mounting assembly 12 is illustrated. In this view temporary holding screw hole 70 is illustrated as being located in the center of electrical junction box 14. A planar surface 72 is illustrated as covering the bottom of housing 30 between steps 40 and 42 of stepped sides 32 and 34, while a planar surface 74 covers the bottom of housing 30 between steps 48 and 50 and planar surface 76 is between steps 52 and 54. Located on planar surface 72 are three knockout holes 80, 82 and 84. Located on planar surface 76 are two additional knockout holes 86 and 88.

Figure 3:
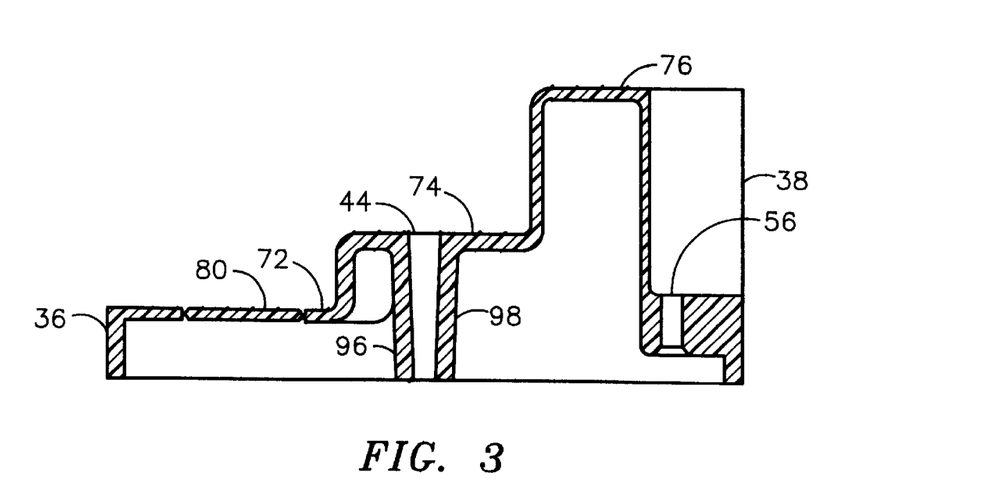
FIG. 3 is a cross sectional view of the right side of FIG. 2 along lines 3—3.

Referring now to FIG. 3, a side view of junction box 14 clearly illustrates the stepped appearance of the two sides 32 and 34. Lines 3—3 are taken through screw hole 56 for the portion of housing 30 defined by deep side 38. For the portion considered the intermediate portion of housing 30, lines 3—3 cross through slot 44. The final portion including shallow side 36 has lines 3—3 traversing through knockout 80.

Figure 4:
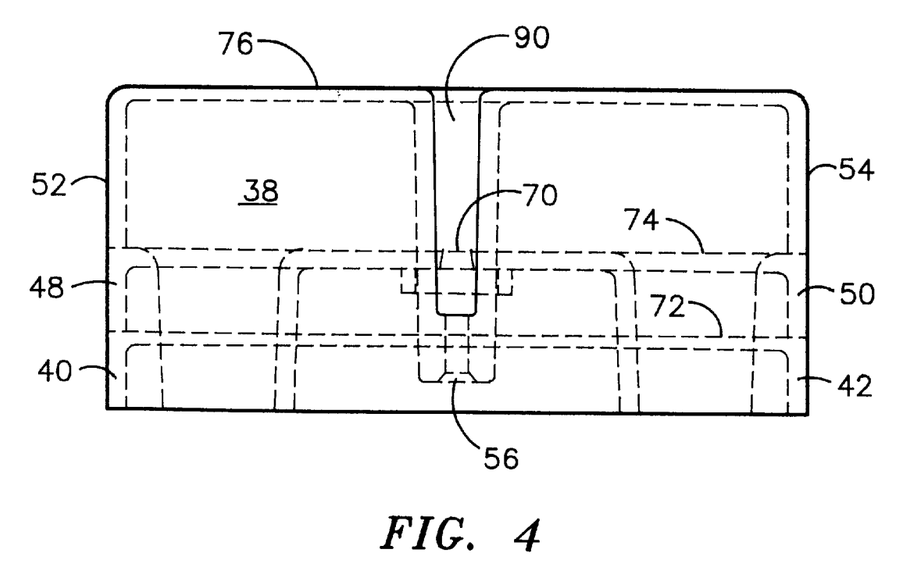
FIG. 4 is a plan view of the right side of the junction box of FIG. 2.

FIG. 4 illustrates deep side 38 with a channel 90 preceding screw hole 56. Steps 52 and 54, 48 and 50, 40 and 42 along with planar surfaces 76, 74 and 72 and screw hole 56 are shown in phantom.

Figure 5:
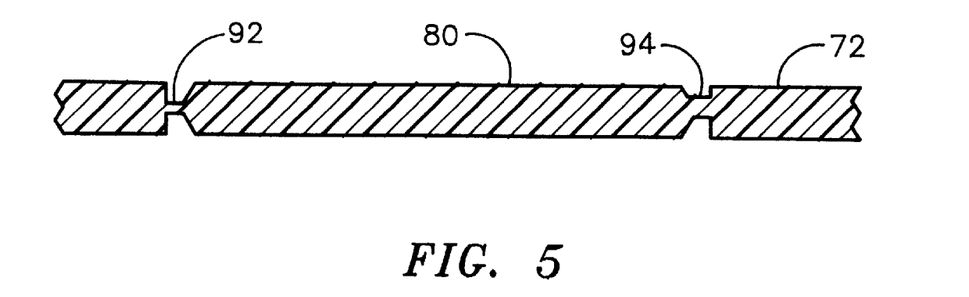
FIG. 5 is a cross sectional view illustrating the detail of a knock out on the bottom of the junction box of FIG. 2.

In FIG. 5, an enlarged sectional view of knockout 80 is illustrated. Although three knockouts are illustrated on planar surface 72 and two are illustrated on planar surface 76, any number may be used following the design of the knockout in the present invention. The knockouts used in the present invention are the same thickness as the planar surfaces 72 and 76 of housing 30 with the circular area of the knockout defined by a reduction in thickness 92 and 94 which may be augmented by arcuate cuts 150. Using this configuration allows a clean or smooth edged hole to be knocked out to receive the cable and permits the use preferably of a shallow depth electrical connector.

Figure 6:
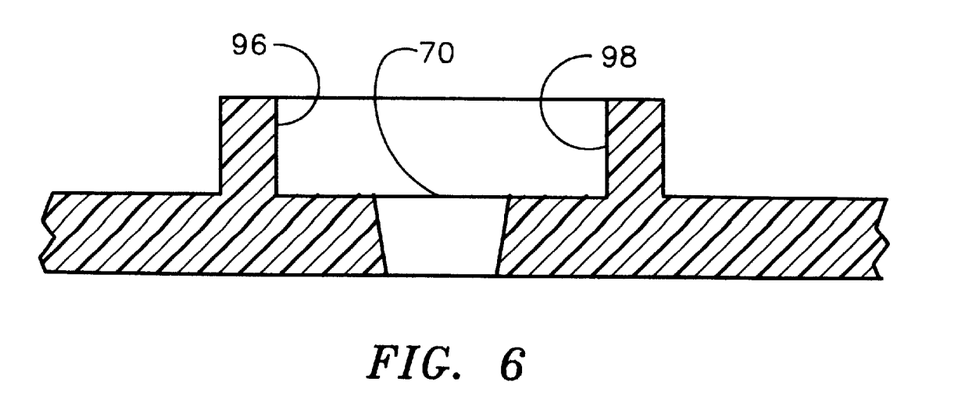
FIG. 6 is a cross sectional view illustrating the detail of a fastener hole.

FIG. 6 illustrates an enlarged sectional view of temporary screw hole 70 which is used to hold electrical box 14 in position temporarily while various elements of ceiling mounting assembly 12 are being aligned. Hole 70 is countersunk in planar surface 74 with walls aligning the head of a temporary screw (not shown) to hold housing 30 in place.

Figure 7:
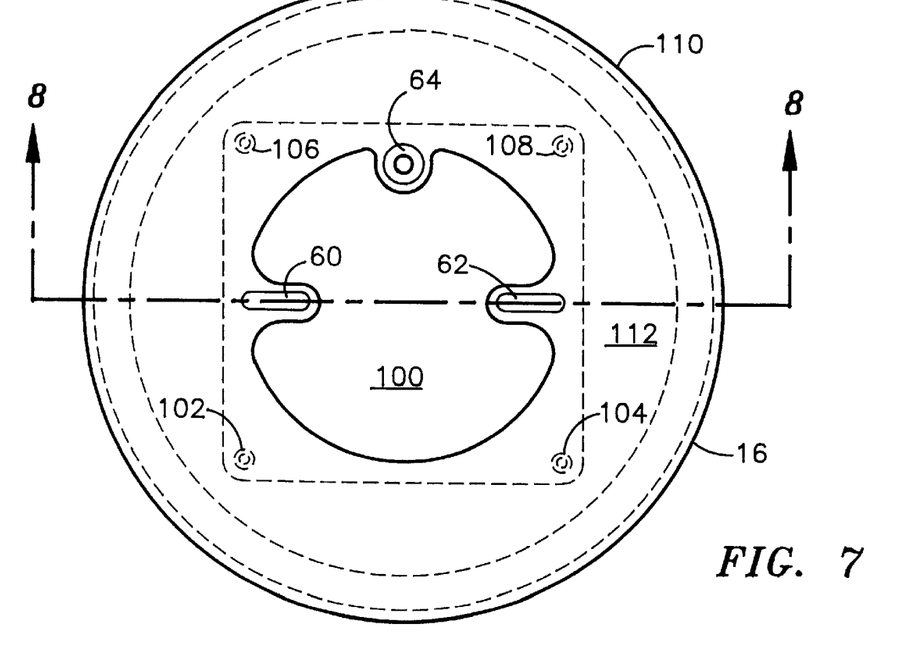
FIG. 7 is a top view of the medallion of the ceiling mounting assembly of FIG. 1.

FIG. 7 is a bottom view of medallion 16 with the outline of the positioning of electrical junction box 14 illustrated in phantom underneath its center. Slots 60 and 62 are shown to align with slots 44 and 46 of junction box 14. Screw hole 64 is aligned with screw hole 56 of junction box 14. Position spacers 102, 104, 106 and 108 can be seen as fitting in the corners of junction box 14.

Figure 8:
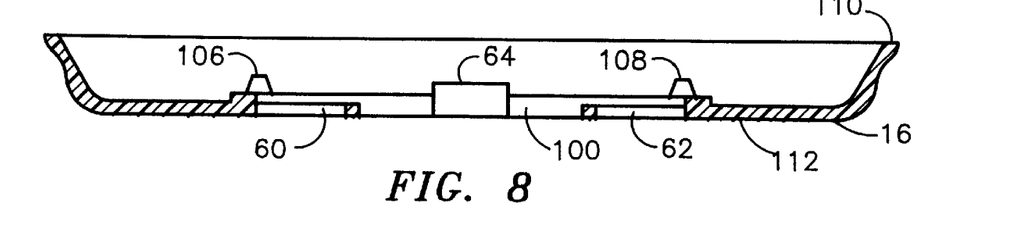
FIG. 8 is a sectional view taken along lines 8—8 of the bezel of the ceiling mounting assembly illustrated in FIG. 7.
Figure 9:
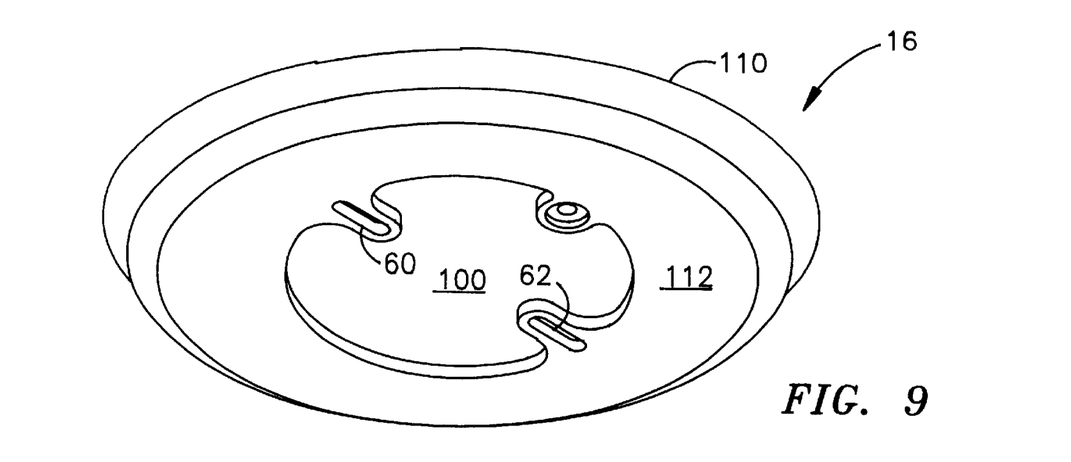
FIG. 9 is a perspective view of the medallion of the ceiling mounting assembly of FIG. 7.

FIG. 8 is an enlarged sectional view taken along lines 8—8 of bezel 16 of ceiling mounting assembly 12. Spacers 106 and 108 can be seen extending outwardly to position bezel 16 with respect to junction box 14. Outer rim 110 is shown at a short distance, approximately one half inch, from face 112 of medallion 16. FIG. 9 is an isometric view of medallion 16 showing its various facets and their relationships in three dimensions.

Figures 10, 11:
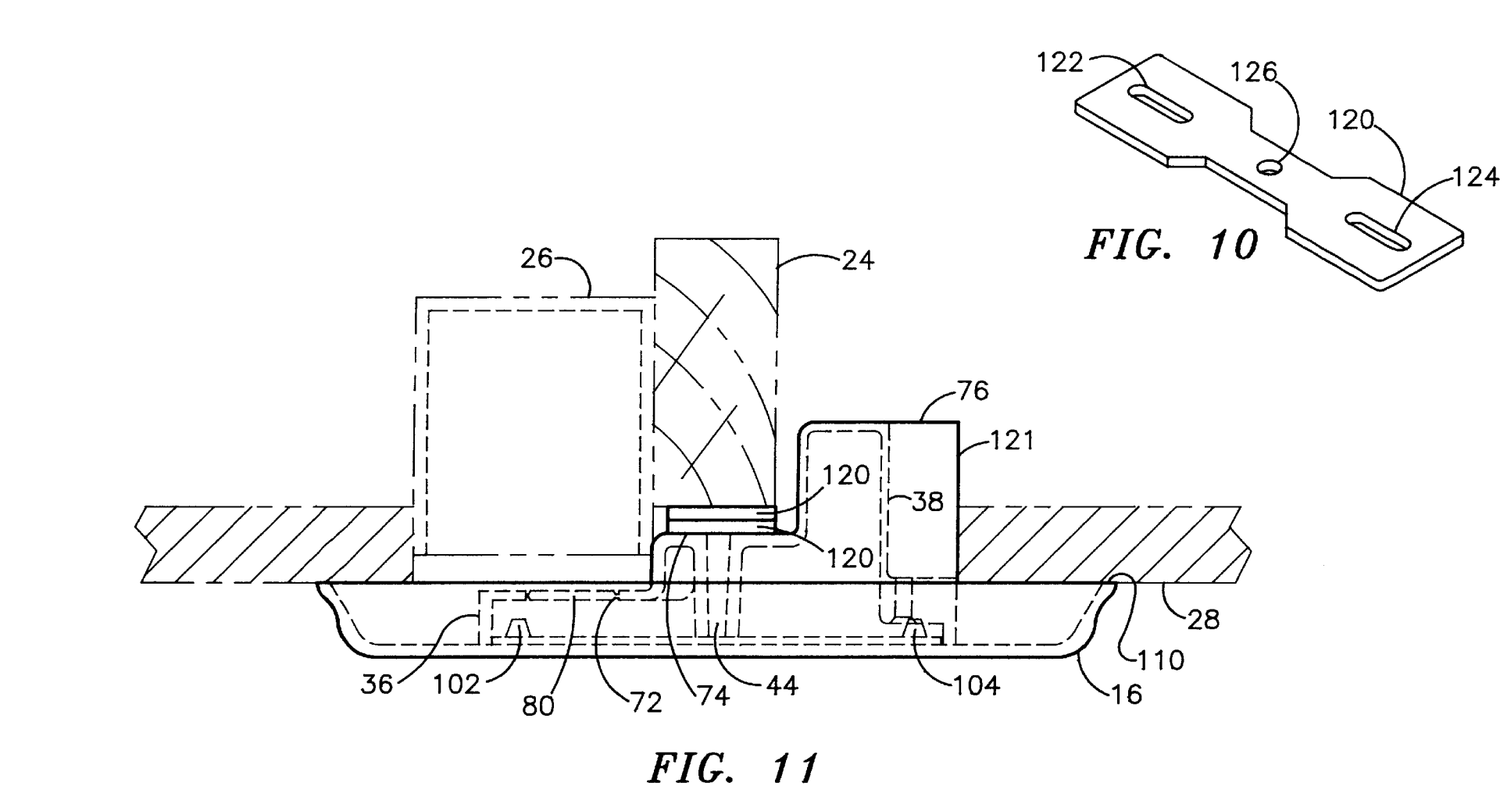
FIG. 10 is a plan view of a spacer used in conjunction with the junction box illustrated in FIG. 2.
FIG. 11 is a partially cut away side view of the ceiling mounting assembly of FIG. 1 illustrated in final position.

FIG. 10 is a plan view of a spacer 120 used in conjunction with junction box 14. Spacer 120 includes slots 122 and 124 which are provided to align with slots 44 and 46 of housing 30. Hole 126 is to align with hole 70 for temporarily holding junction box 14 in place during installation. In the preferred embodiment, spacer 120 is one eighth inch thick. The depth of planar surface 74 is set to accommodate one half inch plasterboard or sheetrock. If the plasterboard through which ceiling mounting assembly 12 is to be placed is greater than one half inch, one or more spacers 120 may be used to assure that planar surface 74 of housing 30 is flush against a ceiling joist while the inner surface of face 112 is flush against the edges of sides 32, 34, 36 and 38 of housing 30 and outer rim 110 of bezel 16 is flush against the outer surface of the wallboard in place, such as wallboard 28 (see FIG. 1).

FIG. 11 is a partially cut away side view of ceiling mounting assembly 12 illustrated in final position. It is to be noted that in the installation pictured, two spacers 120 have been used.

In operation, ceiling joist 24 is located and possibly an existing junction box 26 is located. An opening in the ceiling is made and junction box 14 is temporarily held in place using a screw (not shown) in screw hole 70. Any screw may be used as long as it passes through hole 70. When a screw is placed in hole 70, the area defined by walls 96 and 98 holding the head of the screw prevent junction box 14 from shifting significantly prior to permanent installation but allows enough movement for final adjustments. Any of knockouts 80, 82, 84, 86 and 88 may be used to bring cable or electrical wire through to the electrical device being installed. If an existing junction box is in place, one or more of knockouts 80, 82 and 84 will be used since they will be lined up with the existing junction box (see FIG. 1). Once junction box 14 is in place, medallion 16 is temporarily held in place using screw 18 through hole 64 and screwed into screw hole 56. A fan or other electrical device requiring additional support may then be put in place using a support bracket usually supplied by the manufacturer such as a fan support bracket and permanent screws 20 and 22 are fit through holes 60 and 62 and through holes 44 and 46 into joist 24 to secure the electrical device solidly against joist 24. A housing such as a fan housing (not shown) is usually supplied by the fan or other manufacturer to cover the ceiling medallion assembly.

The holes 44 and 46 are deep oval surrounded by plastic 152 for their length.

The present invention provides a ceiling mounting assembly for holding electrical devices in place on a joist. As described, this assembly includes an electrical junction box 14 having a base of three planar surfaces 72, 74 and 76, with each planar surface at a different depth. A first fastener device or screw is provided for temporarily securing electrical junction box 14 in place through screw hole 70. A ceiling medallion 16 is used for covering electrical junction box 14 to provide a generally finished outward appearance. A second fastener device or temporary holding screw 18 is provided for temporarily securing ceiling medallion 16 to electrical junction box 14. A permanent fixing device or screws 20 and 22 are provided for securely fastening electrical junction box 14 and ceiling medallion 16 to joist 24. Electrical junction box 14 for mounting on joist 24 includes a generally rectangular housing 30 with two opposite sides 32 and 34 having a stepped appearance defining three different depths of the housing. A third side 36 defines a first shallow depth. A fourth side 38 defines the third, deepest depth. A first back piece or planar surface 72 is used to span opposite sides 32 and 34 at a first depth approximately equal to the thickness of one half inch wall board. A second back piece or planar surface 74 is used to span opposite sides 32 and 34 at a second depth greater than the first depth of first planar surface 72. The second depth is approximately equal to twice the thickness of one half inch wallboard. A third back piece or planar surface 76 is used to span opposite sides 32 and 34 and at a third depth greater than the second depth of the second planar surface 74.

The support bracket and fan housing are supplied by the fan manufacturer. The support bracket is fastened to the medallion and box by the long screws 20 and 22 into the wood joist to provide strong holding power.

Figures 12, 13, 14:
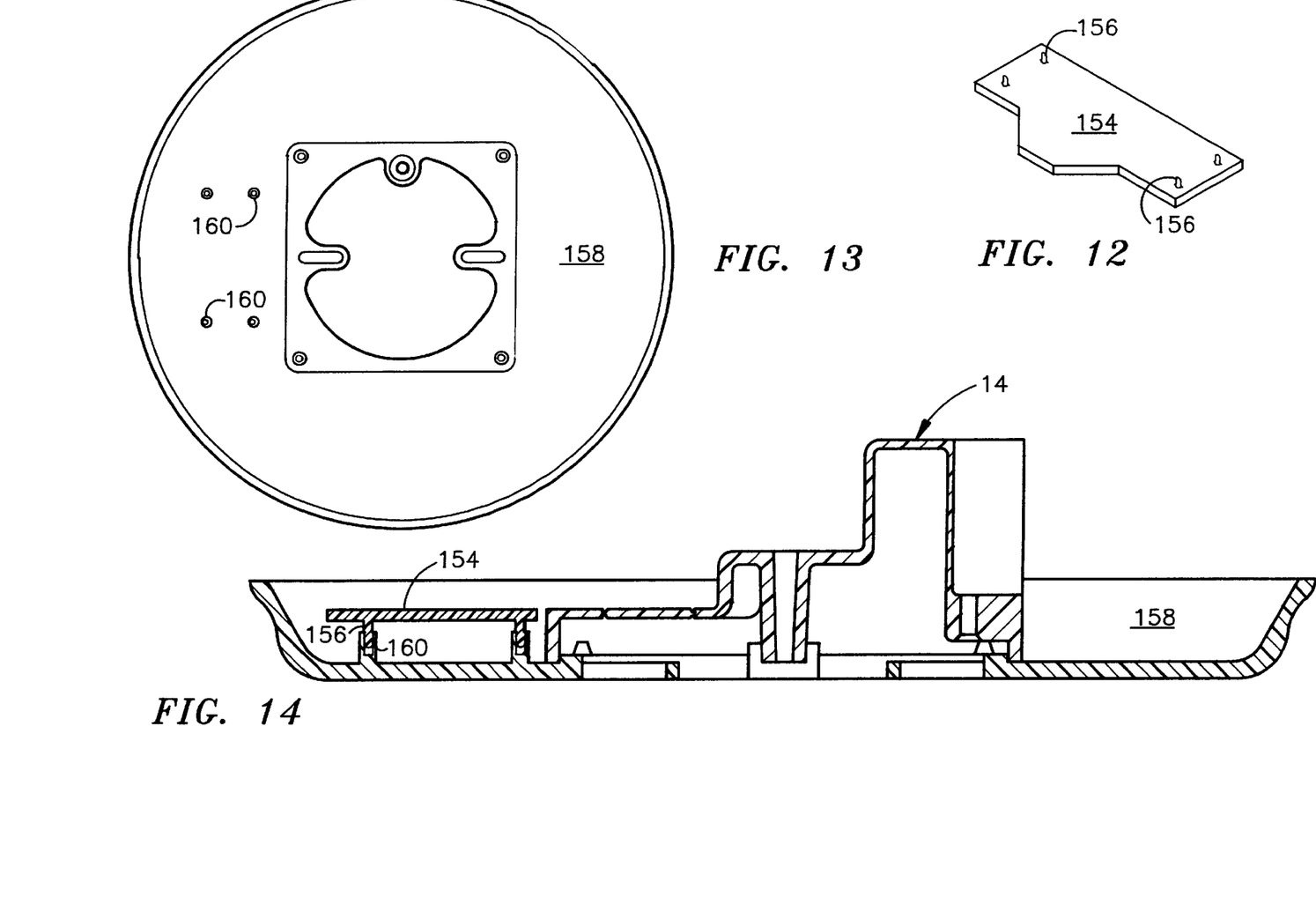
FIG. 12 is a perspective view of a protector plate.
FIG. 13 is a plan view of a larger medallion than that shown in FIG. 7.
FIG. 14 is a cross sectional view of the medallion of FIG. 13.

FIG. 12 shows a protector plate 154 having four locating pins 156. This is an optional cover for the large cover medallion 158 which has four hollow posts 160 into which the locating pins 156 mate to provide an upper planar surface as shown in FIG. 14. The protector plate 154 helps provide additional protection when required.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. An electrical junction box comprising:
   a rectangular housing having two opposite facing stepped sides, each of said sides having three steps;
   a first base having a knock out, said first base joining said opposite sides at a first step depth;
   a second base having provision for mounting said housing on a joist, said second base joining said opposite sides at a second intermediate step depth greater than said first step depth; and
   a third base having a knock out for receiving new electrical wires, said third base joining said opposite sides at a third step depth greater than said second step depth.

2. The electrical junction box according to claim 1 wherein said third base includes provision for temporarily mounting a bezel.

3. The electrical junction box according to claim 1 wherein said first base includes provision for receiving electrical cables from an existing junction box.

4. The electrical junction box according to claim 1 wherein said first depth is approximately one half inch.

5. The electrical junction box according to claim 1 wherein said second depth is approximately twice the depth of said first depth.

6. The electrical junction box according to claim 1 wherein said third step depth rests against said joist.

7. A plastic ceiling mounting assembly for holding electrical devices in place on a load supporting surface, said assembly comprising: an electrical box having a first shallow planar surface having multiple knock outs for receiving electrical wire from an existing electrical junction box, an intermediate second planar surface having provision for attachment to the load supporting surface and a third deep planar surface having multiple knock outs for receiving electrical wire from electrical lines;
   a first fastener device for initially securing said electrical box in place; a ceiling medallion affixed to said electrical box; elongated screw receiving openings extending from said intermediate planar surface to approximately the outer surface of said assembly; and
   two mounting screws extending through said elongated screw receiving openings for screwing said mounting assembly to said load supporting surface.

8. The ceiling mounting assembly for holding electrical devices in place according to claim 7 wherein said third deep planar surface includes provision for temporarily mounting said ceiling medallion.

9. The ceiling mounting assembly for holding electrical devices in place according to claim 7 wherein said first shallow planar surface includes provision for receiving electrical cables from said existing junction box.

10. The ceiling mounting assembly for holding electrical devices in place according to claim 7 wherein said first shallow planar surface is at a first depth of approximately one half inch.

11. The ceiling mounting assembly for holding electrical devices in place according to claim 7 wherein said intermediate second planar surface rests against the surface of a joist and is at a second depth of approximately twice the depth of said first depth.

12. The ceiling mounting assembly for holding electrical devices in place according to claim 7 wherein said third deep planar surface is below the surface of a joist.

13. An electrical box for mounting on a joist comprising:

- a generally rectangular housing having a plurality of depths defined by having four sides, two opposite sides having a stepped appearance defining three different depths of said housing with a third side at a first shallow depth and a fourth side at a third depth;
- a first back piece spanning said opposite sides at said first shallow depth of said plurality of depths approximately equal to the thickness of one half inch wallboard;
- a second back piece spanning said opposite sides at a second depth of said plurality of depths, said second depth greater than said first depth of said first back piece, said second depth approximately equal to twice the thickness of one half inch wallboard; and
- a third back piece spanning said opposite sides and at said third depth of said plurality of depths, said third depth greater than said second depth of said second back piece.

* * * * *